(12) United States Patent
Tian et al.

(10) Patent No.: US 8,416,568 B2
(45) Date of Patent: Apr. 9, 2013

(54) REMOVABLE PORTABLE COMPUTER DEVICE

(75) Inventors: Ping Tian, Beijing (CN); Xiaosong Xia, Beijing (CN); Xing Chen, Beijing (CN); Zhifeng Xin, Beijing (CN)

(73) Assignee: Lenovo (Beijing) Limited, Beijing (CN)

( * ) Notice: Subject to any disclaimer, the term of this patent is extended or adjusted under 35 U.S.C. 154(b) by 223 days.

(21) Appl. No.: 12/651,116

(22) Filed: Dec. 31, 2009

(65) Prior Publication Data

US 2010/0172081 A1 Jul. 8, 2010

(30) Foreign Application Priority Data

Jan. 5, 2009 (CN) .......................... 2009 1 0076091

(51) Int. Cl.
*G06F 1/16* (2006.01)
(52) U.S. Cl.
USPC ................................................... 361/679.55
(58) Field of Classification Search ............. 361/679.29, 361/679.55
See application file for complete search history.

(56) References Cited

U.S. PATENT DOCUMENTS

| | | | | |
|---|---|---|---|---|
| 6,101,087 | A * | 8/2000 | Sutton et al. | 361/679.44 |
| 6,788,527 | B2 * | 9/2004 | Doczy et al. | 361/679.11 |
| 6,937,468 | B2 | 8/2005 | Lin et al. | |
| 6,944,012 | B2 * | 9/2005 | Doczy et al. | 361/679.15 |
| 7,025,274 | B2 * | 4/2006 | Solomon et al. | 235/472.01 |
| 7,035,094 | B2 * | 4/2006 | Huang et al. | 361/679.55 |
| 7,515,405 | B2 * | 4/2009 | Lev et al. | 361/679.55 |
| 7,652,873 | B2 * | 1/2010 | Lee | 361/679.06 |
| 7,916,473 | B2 * | 3/2011 | Jang | 361/679.55 |
| 2001/0022719 | A1 * | 9/2001 | Armitage et al. | 361/681 |
| 2004/0246666 | A1 | 12/2004 | Maskatia et al. | |
| 2004/0246668 | A1 * | 12/2004 | Maskatia et al. | 361/683 |
| 2005/0135049 | A1 * | 6/2005 | Huang et al. | 361/683 |
| 2005/0280984 | A1 * | 12/2005 | Huang et al. | 361/686 |
| 2006/0018089 | A1 * | 1/2006 | Chou | 361/683 |
| 2007/0152633 | A1 | 7/2007 | Lee | |
| 2009/0168336 | A1 * | 7/2009 | Yokote et al. | 361/679.55 |
| 2009/0310292 | A1 * | 12/2009 | Tian et al. | 361/679.29 |
| 2010/0002377 | A1 * | 1/2010 | Kim | 361/679.55 |
| 2010/0118487 | A1 * | 5/2010 | Ou et al. | 361/679.55 |

FOREIGN PATENT DOCUMENTS

CN 1996498 A 7/2007

* cited by examiner

*Primary Examiner* — Lisa Lea Edmonds
(74) *Attorney, Agent, or Firm* — Osha Liang LLP

(57) ABSTRACT

The present invention provides a removable portable computer device. In an embodiment, the portable computer device includes: a flat panel computer; a base; a back plate; a first connection structure through which the base is connected with the back plate; a second connection structure through which the back plate is connected with the flat panel computer. The flat panel computer is removably connected onto the back plate through the second connection structure. In the present invention, the flat panel computer is removably mounted on the back plate through the second connection structure. When the computer is required to be used at other location and a mass of keyboard input is not needed, it only requires to take off the flat panel computer from the back plate so as to easily carry the computer from one location to another location for use, thus the portability is greatly increased.

14 Claims, 6 Drawing Sheets

REMOVABLE PORTABLE COMPUTER DEVICE

TECHNICAL FIELD

The present invention relates to a portable computer device, more particularly, to a notebook computer.

BACKGROUND OF THE INVENTION

Along with the popularization and application of the notebook computer in various fields, people increase the requirement of the portability of notebook computer. Presently, the way to deal with this situation is to continuously attempt to reduce the whole weight and thickness of the entire notebook computer so as to have better portability.

However, no matter which way to employ, the display screen of notebook computer is fixed on the main frame through certain connection structures. When in use, particularly in changing the using location, the entire computer is required to move to the place to be used.

Occurrence of the flat panel computer overcomes the defects of the portable computer in portability at a certain extent. However, since the flat panel computer uses a touch pad to realize the input instead of a keyboard, it is hard to completely replace the notebook computer.

During the researching of existing notebook computer and the flat panel computer by the inventor, the display screen of the most of notebook computers is rotatably fixed on the mainframe through a connection structure. When in use, the display screen is rotated to a certain angle with respect to the mainframe, and when it is closed, the display screen and the mainframe are folded together. When the notebook computer is relocated to a different using location, it is required to move the entire body to the new location.

Furthermore, a new connection structure has been developed, by which the screen is able to rotate 360 degree about a shaft as a rotation axis after the display screen is rotated to a predetermined angle with respect to the mainframe, so that the display surface of the display screen is able to be rotated to the opposite side of the mainframe, that is, the back surface of the display screen of a regular notebook computer. Then, the display screen is folded on the mainframe so that the display surface is exposed at the upper portion of the notebook computer. Under such condition, the display screen is usually provided with a function of touchable input and is served as a flat panel computer. But, no matter which structure is employed, the display screen is fixed on the mainframe, and both the display screen and the mainframe are not removable from each other. When the using location is changed, both the display and the mainframe are required to be moved to the new location to be used.

SUMMARY OF INVENTION

An object of the present invention is to provide a removable portable computer device with better portability.

In order to achieve the above object, the present invention provides a removable portable computer device comprising:
a flat panel computer;
a base;
a back plate;
a first connection structure through which the base is connected with the back plate;
a second connection structure through which the back plate is connected with the flat panel computer;
wherein the flat panel computer is removably connected onto the back plate through the second connection structure.

Preferably, the second connection structure comprises: a first engagement portion provided on said back plate; a second engagement portion provided on said flat panel computer and adapted to engage with the first engagement portion; the flat panel computer is removably secured onto the back plate through engagement between said first engagement portion and the second engagement portion.

Preferably, the first engagement portion comprises:
an upper hook provided at an upper portion of the back plate;
a lower hook provided at a lower portion of the back plate;
the second engagement portion comprises:
an upper slot adapted to engage with the upper hook and provided at a top portion of the flat panel computer;
a lower slot adapted to engage with the lower hook and provided at a bottom portion of the flat panel computer;
the flat panel computer is removably secured onto the back plate with the upper hook being inserted into the upper slot and the lower hook being inserted into the lower slot.

Preferably, the first engagement portion further comprises an elastic member through which the lower hook is elastically provided at the lower portion of the back plate in an extendable and retractable manner.

Preferably, the first engagement portion comprises:
an upper hook provided at an upper portion of the back plate;
a lower clamp groove adapted to engage with a bottom portion of the flat panel computer and provided at a lower portion of the back plate;
the second engagement portion comprises:
an upper slot adapted to engage with the upper hook and provided at the bottom portion of the flat panel computer;
the flat panel computer is removably secured onto the back plate with the upper hook being inserted into the upper slot and the bottom portion of the flat panel computer being inserted into the lower clamp groove.

Preferably, an elastic bearing mechanism therein for bearing the bottom portion of said flat panel computer is further provided in the lower clamp groove.

Preferably, the back plate is removably provided on the base through the first connection structure.

Preferably, the back plate is further provided with a first pattern printing zone, the flat panel computer is further provided with a second pattern printing zone, a pattern with specific effect are formed by a first pattern printed on the first pattern printing zone and a second pattern printed on the second pattern printing zone.

In the present invention, the flat panel computer is removably mounted on the back plate through the second connection structure, when the computer is required to be used at other location and a mass of keyboard input is not needed, it only requires to take off the flat panel computer from the back plate so as to easily carry the flat panel computer from one location to another location for use, thus the portability is greatly increased.

DETAILED DESCRIPTION OF PREFERRED EMBODIMENTS

Figure 1A:
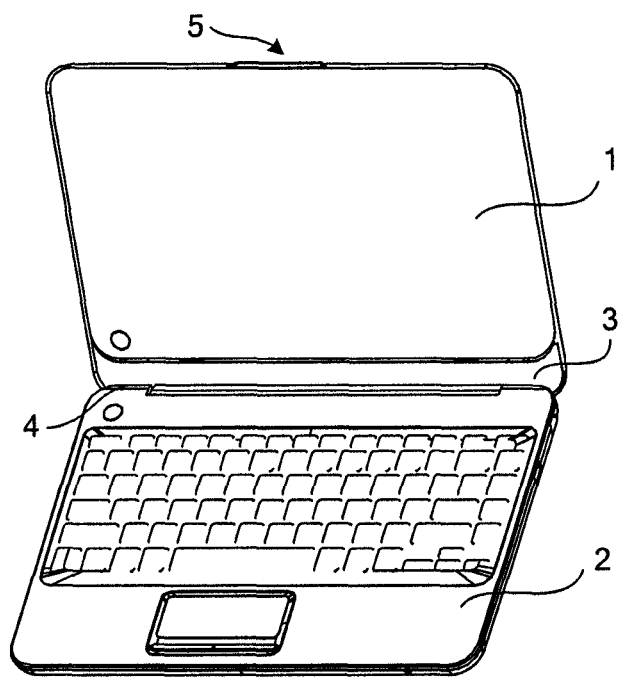
FIG. 1A is a perspective schematic view of the back plate embedded with a flat panel computer according to the present invention.

Embodiments of the present invention will be described hereinafter in detail with reference to the attached drawings, wherein the like reference numerals refer to the like elements throughout the specification. The present invention may, however, be embodied in many different forms and should not be construed as being limited to the embodiments set forth herein; rather, these embodiments are provided so that the present disclosure will be thorough and complete, and will fully convey the concept of the invention to those skilled in the art.

The embodiments of the present invention provide a removable portable computer device comprising: a flat panel computer, a base, a back plate, a first connection structure and a second connection structure; the base is connected with the back plate through the first connection structure, the back plate is connected with the flat panel computer through the second connection structure, the flat panel computer is removably connected onto the back plate through the second connection structure.

The base comprises a case in which there is provided with a processing circuit, a power input interface and other circuit elements; the case is installed thereon with a keyboard, a touch pad, a mouse and other external input devices. The flat panel computer is expanded into a notebook having functions of keyboard input, mouse input, touch pad input and so on, so that it is easy for the user to use the flat panel computer as a notebook computer.

The flat panel computer comprises a touch display screen mounted on a frame, further, a motherboard, a hard drive power input interface, a battery and other electrical components are provided in the frame. The flat panel computer is an existing commercially available flat panel computer.

When the flat panel computer is mounted to the back plate through the second connection structure, the portable computer device has a first operation mode which allows the user to operate the portable computer device as the same as to operate the normal notebook computer with the mainframe being connected with the display screen through a rotation shaft, and to input and/or control the computer through operating the keyboard and/or touch pad when the computer is on.

When the flat panel computer is detached or removed from the back plate through the second connection structure, the portable computer device has a second operation mode, which allows the user to separately operate the flat panel computer through a touching input by using the touch display screen of the flat panel computer.

The second connection structure comprises: a first engagement portion and a second engagement portion, wherein the first engagement portion is provided on the back plate, and the second engagement portion is provided on the flat panel computer, the second engagement portion is adapted to engage with the first engagement portion; the flat panel computer is removably secured on the back plate by engagement between the first engagement portion and the second engagement portion.

The first engagement portion comprises: an upper hook and a lower hook, wherein the upper hook is provided at an upper portion of the back plate, the lower hook is provided at a lower portion of the back plate. The second engagement portion comprises an upper slot and a lower slot, wherein the upper slot is adapted to engage with the upper hook and provided at a top portion of the flat panel computer, and the lower slot is adapted to engage with the lower hook and provided at the bottom portion of the flat panel computer; the flat panel computer is removably secured on the back plate through the upper hook being inserted in the upper slot and the lower hook being inserted in the lower slot.

The first engagement portion further comprises an elastic member through which the lower hook is elastically provided at the lower portion of the back plate in an extendable and retractable manner.

Alternatively, the first engagement portion comprises an upper hook and a lower clamp groove, wherein the upper hook is provided at an upper portion of the back plate, the lower clamp groove is adapted to engage with a bottom portion of the flat panel computer and provided at a lower portion of the back plate; the second engagement portion comprises an upper slot adapted to engage with the upper hook and provided at the bottom portion of the flat panel computer; through the upper hook being inserted into the upper slot and the bottom portion of the flat panel computer being inserted into the lower clamp groove, the flat panel computer is removably secured on the back plate.

The lower clamp groove is further provided with an elastic bearing mechanism therein for elastically bearing the bottom portion of the flat panel computer.

The back plate is removably provided on the base through the first connection structure.

Figure 5:
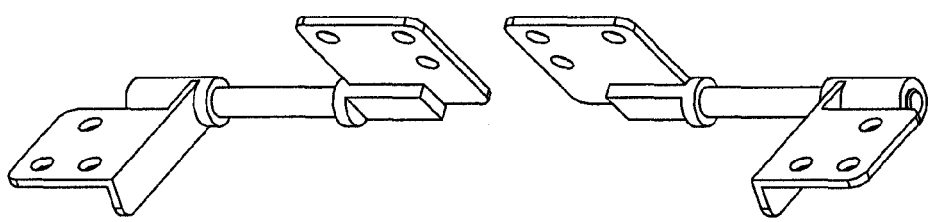
FIG. 5 is a structural schematic view of a first connection structure served as a rotation shaft.

The first connection structure may be a rotation shaft which is connected with the base and the back plate respectively, allowing the back plate to rotate about the base. An example of the rotation shaft as the first connection structure is shown in FIG. 5, however, the present invention is not limited thereto, obviously, other rotation shafts may also be employed.

The back plate is further provided with a first pattern printing zone thereon, and the flat panel computer is further provided with a second pattern printing zone thereon. A pattern with specific effect is formed by a first pattern printed on the first pattern printing zone and a second pattern printed on the second pattern printing zone.

The embodiments of the present invention are explained in detail by referencing following accompany drawings.

The First Embodiment

Figure 1B:
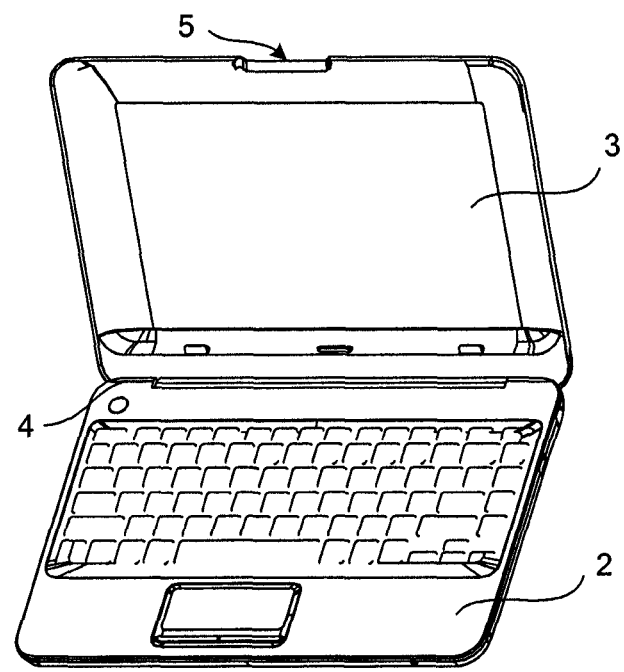
FIG. 1B is a perspective schematic view according to the present invention in which the flat panel computer is taken off.

As shown in FIGS. 1A and 1B, a removable portable computer device according to a first embodiment of the present invention comprises: a flat panel computer 1 having abilities or functions of displaying and calculating, a base 2, a back plate 3, a first connection structure 4 and a second connection structure 5; the first connection structure 4 is provided on the base 2 for connecting with the back plate 3. By means of the first connection structure 4, the back plate 3 is rotatably provided on the base 2. The first connection structure 4 can employ the existing rotation shaft shown in FIG. 5, which allows the back plate 3 to rotatably fixed on the base 2. Alternatively, the first connection structure can take the form of any removable means which is provided on the base 2 in a removable manner. The second connection structure 5 is provided on both the back plate 3 and the flat panel computer 1 for connecting the back plate 3 with the flat panel computer 1; the flat panel computer is removably connected on the back plate 3 through the second connection structure 5. The flat panel computer 1 is served as the display screen and the mainframe system of the notebook computer when it is mounted on the back plate 3 through the second connection structure 5.

In the embodiment of the present invention, the flat panel computer 1 comprises a touch display screen mounted on a frame, and a motherboard, a hard drive power input interface, a battery and other electrical components are further provided in the frame. The base 2 comprises a mounting case provided with a processing circuit, power input interface and other circuit members therein, the case is provided with an operation keyboard, a touch pad, a mouse and other external input components thereon. The flat panel computer is expanded into a notebook computer with functions of the keyboard input, the mouse input, the touch pad input and the like through the base 2, so that the user can easily use the flat panel computer 1 as the notebook computer.

The flat panel computer 1 is removably mounted on the back plate 3 through the second connection structure 5, when the computer is required to be used at other location and a mass of keyboard input is not needed, it only requires to take off the flat panel computer 1 from the back plate 3 so as to easily carry the computer from one location to another location for use, thus the portability is greatly increased.

Figure 2A:
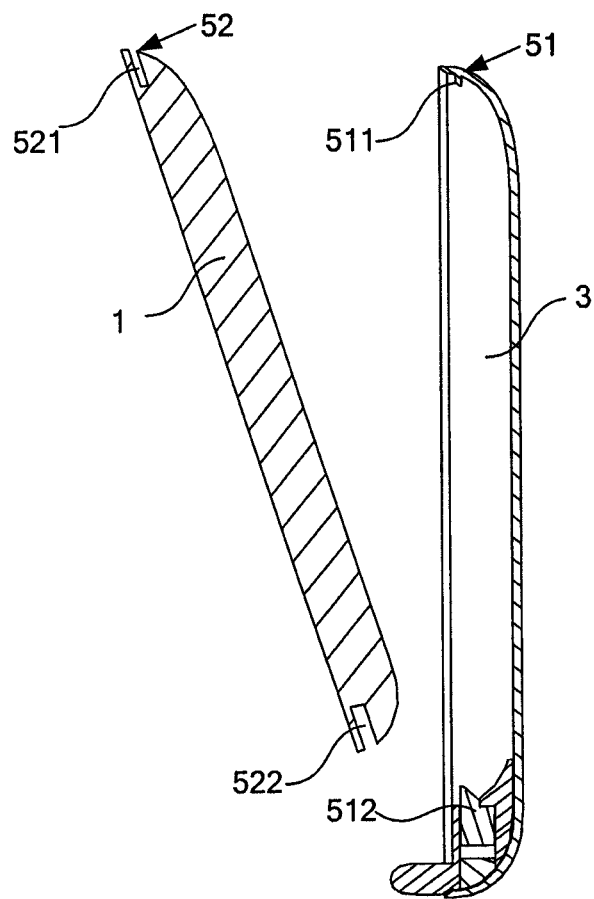
FIG. 2A is a structural schematic view of a first embodiment according to the present invention in which the flat panel computer is separated from the back plate.
Figure 2B:
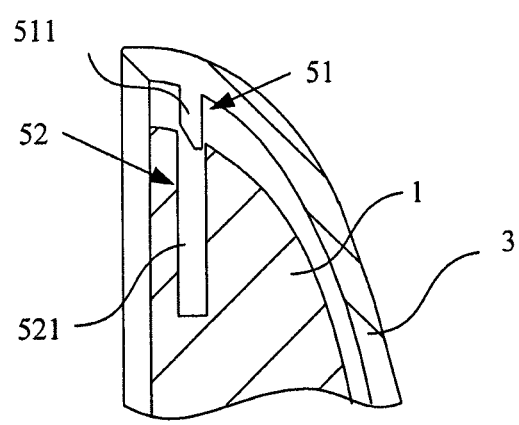
FIG. 2B is a partial enlarged schematic view showing the top portion of the flat panel computer being inserted into the back plate according to the first embodiment of the present invention.

The detail configuration of the second connection 5 is shown as FIGS. 2A and 2B. As shown in FIGS. 2A and 2B, the second connection structure 5 comprises a first engagement portion 51 and a second engagement portion 52, wherein the first engagement portion 51 is provided on the back plate 3, the second engagement portion 52 is provided on the flat panel computer 1. The second engagement portion 52 is adapted to engage with the first engagement portion 51, for example, if the first engagement portion employs a hook structure, the second engagement portion may employ a slot structure to fit with the first engagement portion. If the first engagement portion employs a slot structure, the second engagement portion may employ a hook structure to fit with the first engagement portion. Certainly, other similar engagement structures can also be adopted. The flat panel computer 1 is removably mounted on the back plate 3 by the engagement between the first engagement portion and the second engagement portion.

As shown in FIGS. 2A, 2B, 2C, 2D, the first engagement portion 51 comprises an upper hook 511 and a lower hook 512, the upper hook 511 is provided at an upper portion of the back plate 3, the lower hook 512 is provided at a lower portion of the back plate 3. The second engagement portion 52 comprises an upper slot 521 and a lower slot 522, the upper slot 521 is adapted to engage with the upper hook 511 and provided at the top portion of the flat panel computer 1; the lower slot 522 is adapted to engage with the lower hook 512 and provided at the bottom portion of the flat panel computer 1. Therefore, the flat panel computer 1 is removably secured on the back plate 3 by the upper hook 511 being inserted into the upper slot 521 and the lower hook 512 being inserted into the lower slot 522.

Figure 2C:
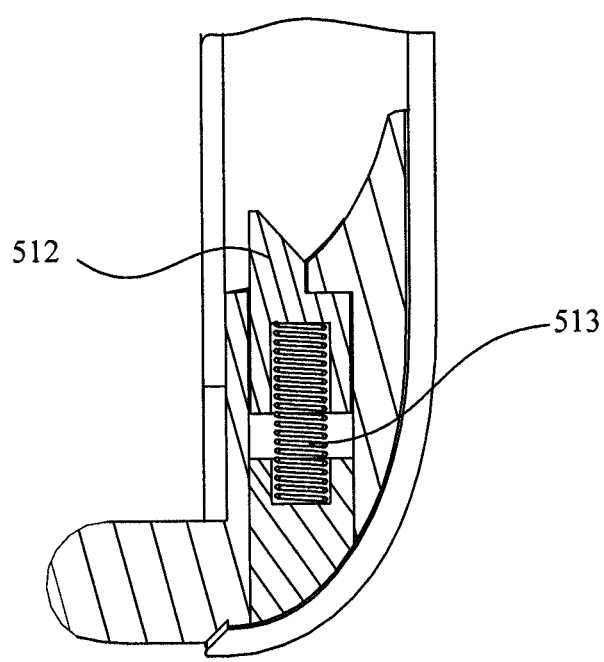
FIG. 2C is a partial enlarged schematic view showing the bottom portion of the flat panel computer being inserted into the back plate according to the first embodiment of the present invention.
Figure 2D:
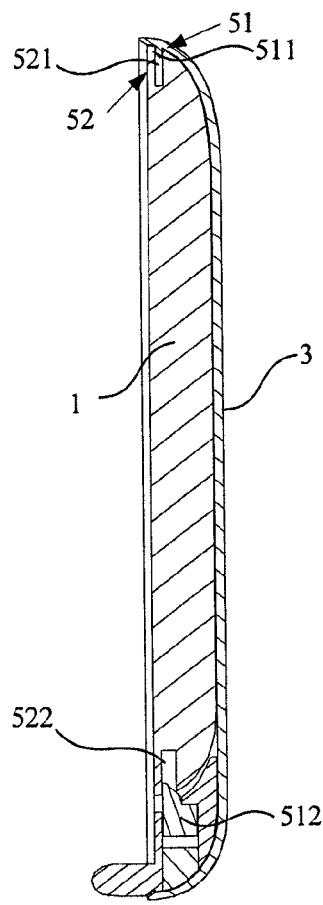
FIG. 2D is a whole structural schematic view showing that the flat panel computer is inserted into the back plate according to the first embodiment of the present invention.

In order to facilitate assembling and disassembling the flat panel computer 1, the first engagement portion 51 further comprises an elastic member 513, the lower hook 512 is elastically provided at the lower portion of the back plate 3 in an extendable and retractable manner through the elastic member 513. Thus, when the flat panel computer 1 is assembled onto the back plate 3, the lower slot 522 provided at the bottom portion of the flat panel computer 1 accommodates the lower hook 521 and press down the elastic member 513 hardly, and then the upper slot 521 provided at the top portion of the flat panel computer 1 receives the upper hook 511. Under the elastic biasing force of the elastic member 513, the lower hook 512 is securely inserted into the lower slot 522, and the upper hook 511 is also securely inserted into the upper slot 521. Consequently, it is ensured that the flat panel computer 1 is able to be stably and removably fixed onto the back plate 3. When the flat panel computer is required to be disassembled from the back plate 3, it only requires to push the flat panel computer 1 down so that the elastic member 513 is compressed, after the upper hook 511 quits from the upper slot 521, and then a force causing the flat panel computer 1 to be away from the back plate 3 is applied to the flat panel computer 1, the flat panel computer 1 is then taken off from the back plate 3 after the lower hook 512 quits from the lower slot 522. The elastic member 513 according to the embodiment of the present invention can take the form of a compression spring as shown in FIG. 2C, or a rubber with certain elasticity. Obviously, other material or member with elasticity also can be employed.

The Second Embodiment

Figure 3:
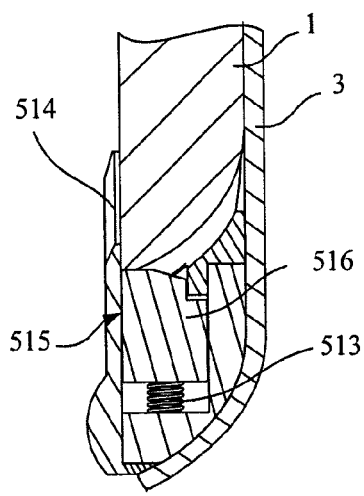
FIG. 3 is a partial enlarged schematic view showing the bottom portion of the flat panel computer inserted into the back plate according to a second embodiment of the present invention.

The structures of the embodiment is substantially the same as those of the first embodiment, differences therebetween reside mainly as shown in FIG. 3, the first engagement portion 51 comprises an upper hook 511 and a lower clamp groove 514 with like construction as that of the first embodiment. The upper hook 511 is also provided on the upper portion of the back plate 3; the lower clamp groove 514 is adapted to engage with the bottom portion of the flat panel computer 1 and provided at the lower portion of the back plate 3, that is, when the bottom portion of the flat panel computer 1 is inserted into the lower clamp groove 514, the lower clamp groove 514 is able to well accommodate the bottom portion of the flat panel computer 1. The second engagement portion 52 comprises an upper slot 521 adapted to engage with the upper hook 511 and provided at the bottom portion of the flat panel computer 1, the configuration of the upper hook 511 is similar as that in the first embodiment. When the flat panel computer 1 is mounted onto the back plate 3, the flat panel computer is removably secured onto the back plate through the upper hook 511 being inserted into the upper slot 521 and the bottom portion of the flat panel computer 1 being inserted into the lower clamp groove 514.

In order to facilitate assembling and disassembling the flat panel computer 1, an elastic bearing mechanism 515 for elastically bearing the bottom portion of the flat panel computer 1 is further provided in the lower clamp groove 514. Thus, when the flat panel computer 1 is going to be assembled onto the back plate 3, the bottom portion of the flat panel computer 1 is inserted into the lower clamp groove 514 and press down the elastic bearing mechanism 515 hardly, and then the upper slot 521 provided at the top portion of the flat panel computer 1 receives or catches the upper hook 511. Under the elastic biasing force of the elastic bearing mechanism 515, the upper hook 511 is securely inserted into the upper slot 521. Consequently, it is ensured that the flat panel computer 1 is able to be stably and removably mounted onto the back plate 3. When the flat panel computer is required to be disassembled from the back plate 3, it only requires to push the flat panel computer 1 down so that the elastic bearing mechanism 515 is compressed, after the upper hook 511 quits from the upper slot 521, and then a force causing the flat panel computer 1 to be away from the back plate 3 is applied to the flat panel computer 1, the flat panel computer 1 is then taken off from the back plate 3 after the bottom portion of the computer quits from the lower clamp groove 514.

The elastic bearing mechanism 515 according to the embodiment of the present invention can employ the structure formed by a pressing block 516 and an elastic member 513 as shown in FIG. 3. The pressing block 516 is provided within the lower clamp groove 514 through the elastic member 513. When the flat panel computer 1 inserts into the lower clamp groove 514, the bottom of the flat panel computer 1 bears against onto the pressing block 516, and the flat panel computer 1 is stably mounted onto the back plate 3 by virtue of the elastic member 513. The elastic member 513 according to the embodiment of the present invention can take form of a spring as shown in FIG. 3, or a rubber with certain elasticity. Obviously, other material or member with elasticity also can be employed.

The detail engagement mechanism is not limited thereto, rather, any other similar engagement structures can also be employed for removably mounting the flat panel computer 1 onto the back plate 3.

The Third Embodiment

Figure 4A:
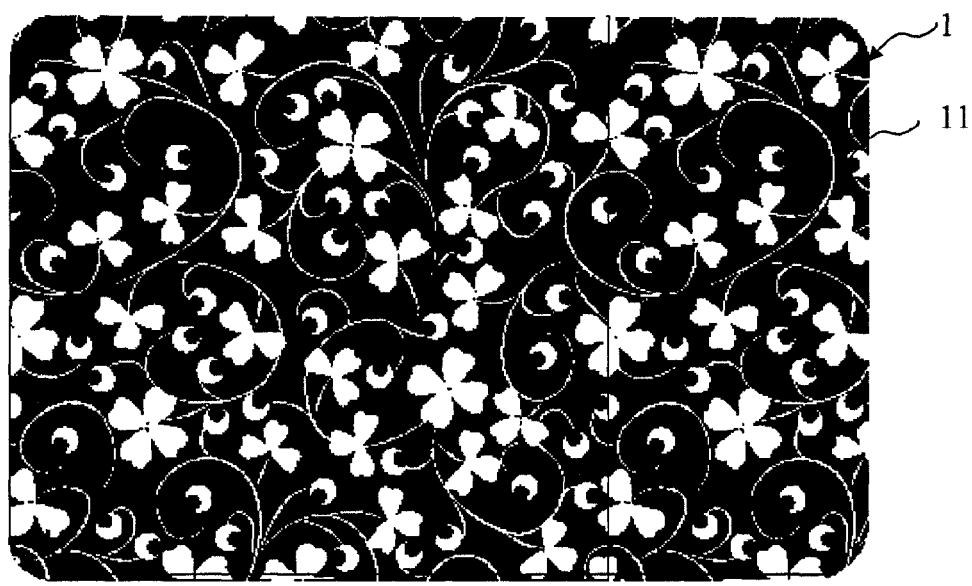
FIG. 4A is a structural schematic view of a first pattern printing zone of the flat panel computer according to a third embodiment of the present invention.
Figure 4B:
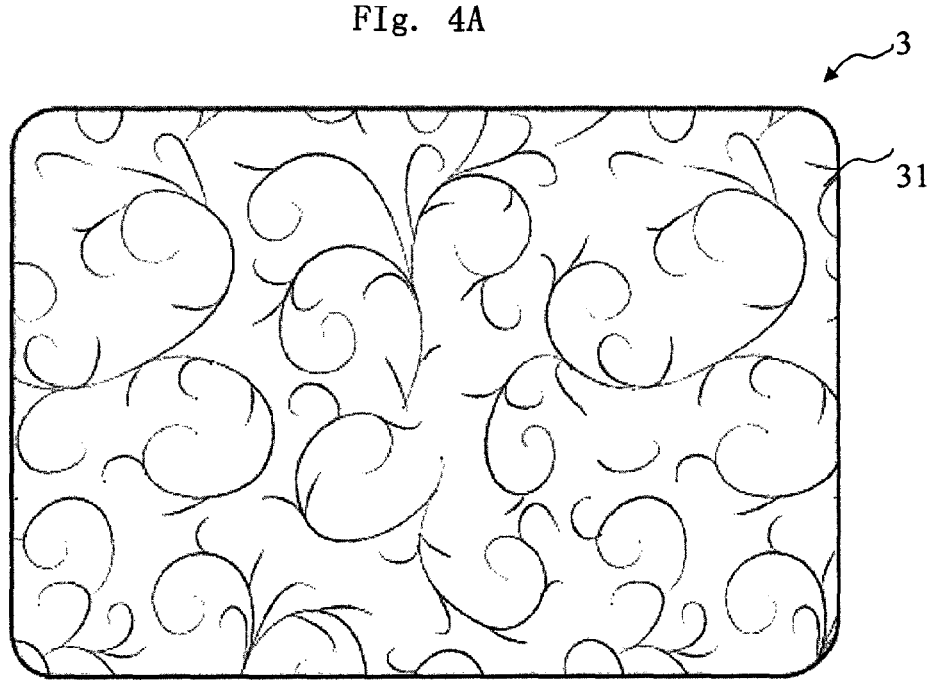
FIG. 4B is a structural schematic view of a second pattern printing zone of the back plate according to the third embodiment of the present invention.
Figure 4C:
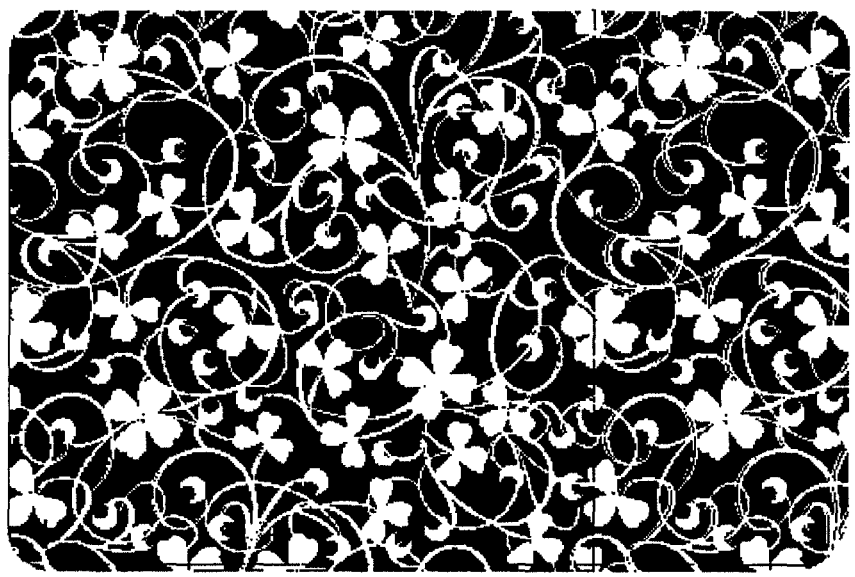
FIG. 4C a schematic view of a pattern with specific effects formed by the pattern printed on the first pattern printing zone and the pattern printed on the second pattern printing zone after the flat panel computer is mounted to the back plate.

As shown in FIGS. 4A, 4B, 4C, the back plate 3 according to the third embodiment of the present invention is further provided with a first pattern printing zone 31 thereon, the flat panel computer 1 is further provided with a second pattern printing zone 11 thereon, and a pattern with specific effect is formed by a first pattern printed on the first pattern printing zone 31 and a second pattern printed on the second pattern printing zone 11. As shown in the figures, the first pattern printed in the first pattern printing zone 31 includes floral leafs and flowers without sprays, and the second pattern printed in the second pattern printing zone 11 includes sprays without floral leafs and flowers, both patterns are superposed to form a pattern with an unitary effect. Furthermore, other patterns having three-dimensional effects can also be printed as desired.

Although a few embodiments of the present invention have been shown and described, it would be appreciated by those skilled in the art that changes may be made in these embodiments without departing from the principles and spirit of the invention, the scope of which is defined in the claims and their equivalents.

What is the claimed:

1. A removable portable computer device comprising:
a flat panel computer;
a base including a case, a keyboard being provided on the case;
a back plate;
a first connection structure through which the base is connected with the back plate;
a second connection structure through which the back plate is connected with the flat panel computer;
wherein the flat panel computer is removably connected onto the back plate through the second connection structure;
wherein the back plate is rotatably connected with the base through the first connection structure, so that the flat panel computer can be used as a notebook computer when the flat panel computer is connected onto the back plate; and
wherein the back plate can be used as an openable and closable cover for covering the case when the flat panel computer is removed from the back plate.

2. The removable portable computer device according to claim 1, characterized in that, said second connection structure comprises:
a first engagement portion provided on said back plate;
a second engagement portion provided on said flat panel computer and adapted to engage with the first engagement portion;
the flat panel computer is removably secured onto the back plate through engagement between said first engagement portion and the second engagement portion.

3. The removable portable computer device according to claim 2, characterized in that,
said first engagement portion comprises:
an upper hook provided at an upper portion of the back plate;
a lower hook provided at a lower portion of the back plate;
said second engagement portion comprises:
an upper slot adapted to engage with the upper hook and provided at a top portion of the flat panel computer;
a lower slot adapted to engage with the lower hook and provided at a bottom portion of the flat panel computer;
said flat panel computer is removably secured onto the back plate with the upper hook being inserted into the upper slot and the lower hook being inserted into the lower slot.

4. The removable portable computer device according to claim 3, characterized in that, said first engagement portion further comprises an elastic member through which the lower hook is elastically provided at the lower portion of the back plate in an extendable and retractable manner.

5. The removable portable computer device according to claim 2, characterized in that,
the first engagement portion comprises:
an upper hook provided at an upper portion of the back plate;
a lower clamp groove adapted to engage with a bottom of the flat panel computer and provided at a lower portion of the back plate;
the second engagement portion comprises:

an upper slot adapted to engage with the upper hook and provided at the bottom portion of the flat panel computer;

the flat panel computer is removably secured onto the back plate with the upper hook being inserted into the upper slot and the bottom portion of the flat panel computer being inserted into the lower clamp groove.

6. The removable portable computer device according to claim 5, characterized in that, the lower clamp groove is further provided with an elastic bearing mechanism therein for bearing the bottom portion of said flat panel computer.

7. The removable portable computer device according to claim 1, characterized in that, said back plate is removably provided on the base through the first connection structure.

8. The removable portable computer device according to claim 1, characterized in that, said back plate is further provided with a first pattern printing zone, said flat panel computer is further provided with a second pattern printing zone, a pattern with specific effect are formed by a first pattern printed on the first pattern printing zone and a second pattern printed on the second pattern printing zone.

9. The removable portable computer device according to claim 8, characterized in that,
said second connection structure comprises:
a first engagement portion provided on said back plate;
a second engagement portion provided on said flat panel computer and adapted to engage with the first engagement portion;
the flat panel computer is removably secured onto the back plate through engagement between said first engagement portion and the second engagement portion.

10. The removable portable computer device according to claim 9, characterized in that,
said first engagement portion comprises:
an upper hook provided at an upper portion of the back plate;
a lower hook provided at a lower portion of the back plate;

said second engagement portion comprises:
an upper slot adapted to engage with the upper hook and provided at a top portion of the flat panel computer;
a lower slot adapted to engage with the lower hook and provided at a bottom portion of the flat panel computer;
said flat panel computer is removably secured onto the back plate with the upper hook being inserted into the upper slot and the lower hook being inserted into the lower slot.

11. The removable portable computer device according to claim 10, characterized in that, said first engagement portion further comprises an elastic member through which the lower hook is elastically provided at the lower portion of the back plate in an extendable and retractable manner.

12. The removable portable computer device according to claim 9, characterized in that,
the first engagement portion comprises:
an upper hook provided at an upper portion of the back plate;
a lower clamp groove adapted to engage with a bottom of the flat panel computer and provided at a lower portion of the back plate;
the second engagement portion comprises:
an upper slot adapted to engage with the upper hook and provided at the bottom portion of the flat panel computer;
the flat panel computer is removably secured onto the back plate with the upper hook being inserted into the upper slot and the bottom portion of the flat panel computer being inserted into the lower clamp groove.

13. The removable portable computer device according to claim 12, characterized in that, the lower clamp groove is further provided with an elastic bearing mechanism therein for bearing the bottom portion of said flat panel computer.

14. The removable portable computer device according to claim 8, characterized in that, said back plate is removably provided on the base through the first connection structure.

* * * * *